Figure 1:
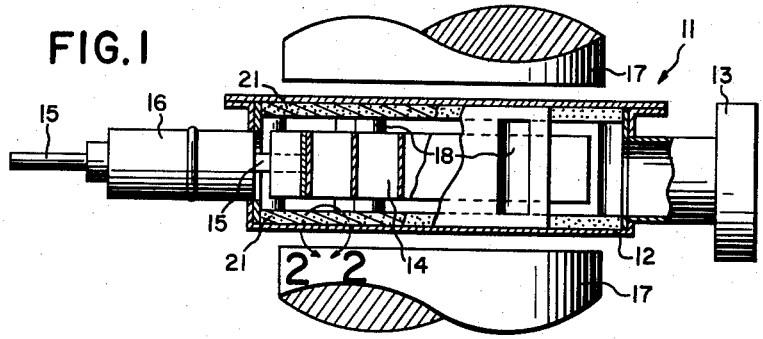

Sept. 8, 1964     R. L. JEPSEN     3,147,910
VACUUM PUMP APPARATUS
Filed Aug. 30, 1961

INVENTOR.
ROBERT L. JEPSEN
BY
ATTORNEY

United States Patent Office 3,147,910
Patented Sept. 8, 1964

3,147,910
VACUUM PUMP APPARATUS
Robert L. Jepsen, Los Altos, Calif., assignor to Varian Associates, Palo Alto, Calif., a corporation of California
Filed Aug. 30, 1961, Ser. No. 135,010
3 Claims. (Cl. 230—69)

This invention relates to improved high vacuum hydrogen pumping apparatus. The present invention has particularly application in the pumping of hydrogen and hydrogen isotopes by electrical sputter-ion pumps.

The pumping mechanism for such chemically active gases as oxygen and nitrogen in cold cathode gas discharge sputter-ion pumps (for example, the type described and claimed in U.S. Patent 2,993,638 issued to L. D. Hall, J. C. Helmer and R. L. Jepsen on July 25, 1961) is dominated by chemical combination with sputtered active metal atoms from the cathodes. These gases cause cathode materials such as, for example, titanium or zirconium to be sputtered rapidly enough that approximately one atom of gas is pumped for each ion formed in the discharge. Most of the pumped oxygen and nitrogen reside on the anode of the pump in chemical combination with sputtered cathode material.

In contrast, hydrogen and its isotopes are so light that their ions produce comparatively little sputtering. Despite this it is found that present sputter-ion pumps employing cathodes made of, for example, titanium or zirconium generally display a hydrogen pumping speed which is more than twice that for oxygen or nitrogen. It has also been established experimentally that most of the hydrogen is pumped by diffusion into the cathodes rather than by chemical combination at the anode. In addition, significant residual pumping (continued pumping after the discharge voltage is removed) occurs indicating that hydrogen can be pumped by absorption resulting from the direct molecular contact with the cathode surfaces without the necessity for dissociation, ionization or ion burial.

The present invention provides a pumping mechanism which exhibits an extremely high hydrogen pumping speed. One important ingredient of the present invention is the use of a porous body made of an active metal into which hydrogen is soluble.

The present invention also utilizes the porous body for the cathode electrodes in a sputter-ion pump to provide a novel electrical vacuum pump in which the porous cathode electrodes produce high speed hydrogen pumping and the pump's gas discharge maintains the cathode surfaces in condition for optimum pumping performance. This combined effect results in an electrical vacuum pump exhibiting extremely high activated and residual pumping speeds for hydrogen and hydrogen isotopes.

The object of the present invention, therefore, is to provide an improved mechanism for the pumping of hydrogen and hydrogen isotopes.

One feature of the present invention is the provision of a novel porous pumping body which has an extremely high molecular hydrogen absorption rate.

Another feature of the present invention is the provision in an electrical sputter-ion pump of unique porous cathode electrodes into which the rates of hydrogen diffusion and absorption are extremely high and which are maintained in condition for optimum performance by the pump's gas discharge.

Still another feature of the present invention is the provision of an electrical vacuum pump of the above featured type having sintered active metal cathode electrodes.

Another feature of the present invention is the provision of an electrical sputter-ion pump having active metallic cathode electrodes in which cracks, fissures and pores have been created by mechanical deformation.

Figure 2:
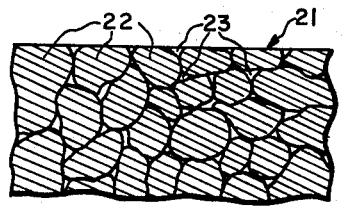
Figure 3:
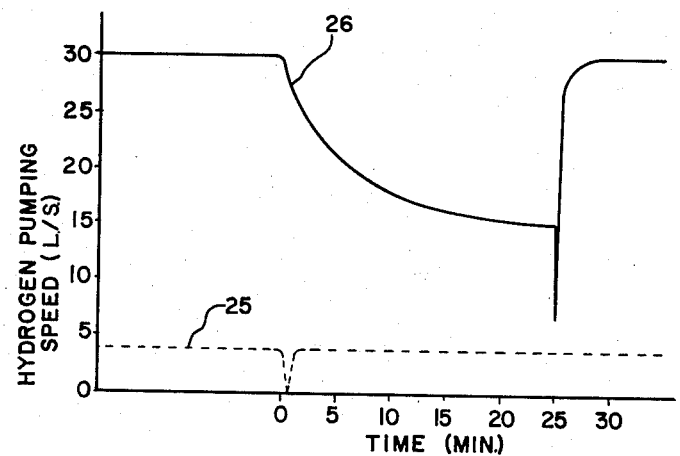

These and other features and advantages of the present invention will become more apparent upon a perusal of the following specification taken in connection with the accompanying drawings, wherein FIG. 1 is a front view partly in cross section of a novel sputter-ion pump embodiment of the present invention, FIG. 2 is a greatly enlarged cross sectional view of the cathode electrodes shown in the electrical vacuum pump embodiment of FIG. 1, and FIG. 3 is a diagram showing the comparative hydrogen pumping speeds of the improved electrical sputter-ion pump of the present invention and of a conventional sputter-ion vacuum pump of equivalent size.

Referring now to FIGS. 1 and 2 there is shown an electrical vacuum pump 11 having a hollow envelope 12 with one open end attached to a mounting flange 13. A cellular open ended anode electrode 14 is carried within the envelope 12 upon the end of a conductive rod 15 which extends outwardly of the envelope 12 through an aperture therein. The conductive rod 15 is insulated from and carried by the envelope 12 through the intermediary of annular insulator assembly 16. The free end of the conductive rod 15 provides a terminal for applying a positive anode voltage to the anode electrode 14. Straddling the envelope 12 is a pair of pole pieces 17 of a magnet which provides a magnetic field through the open ends of the anode 14. Mounted on the inner walls of the vacuum envelope 12 and opposite the open ends of cellular anode electrode 14 are two sintered cathode plates 21 spaced apart by the spacing bands 18.

As shown more clearly in the greatly enlarged view of FIG. 2 the sintered cathode electrodes 21 are composed of many tiny metallic particles 22 which have been bonded by heating to form a strong cohesive body. The particles 22 are active metal into which hydrogen is soluble, for example, titanium or zirconium. Between the metal particles 22 are many pores or openings 23 which extend into the body of the cathode electrode 21.

In typical operation of the device of FIG. 1 the flange member 13 is connected for gas communication to a suitable vacuum system mating flange (not shown) and positive potential is applied to the anode 14 via conductive rod 15 while the envelope 12 and supported cathode electrodes 21 are preferably operated at ground potential.

Ionization which results from the combined effect of the potential difference between the cathode and anode electrodes and the applied magnetic field is well known in the sputter-ion pump field and will be described only briefly as follows.

In steady state operation secondary electrons are emitted from the cathode electrodes 21 and are attracted to the anode electrode 14 because of the positive potential thereon, but are constrained by the magnetic field from directly reaching the anode electrode 14. However, upon making a collision with a gas molecule the electron loses energy and is thereby able to move closer to the anode electrode. In addition, some of these collisions between electrons and gas molecules are ionizing collisions which liberate positive gas ions and secondary electrons which are added to the discharge. The positive ions produced are then driven into the cathode electrodes 21 dislodging particles of cathode material which are thereby sputtered onto the surrounding structure to produce gettering of gas molecules coming into contact therewith. In this manner the envelope 12 and therefore structures communicating therewith are evacuated.

However, when hydrogen is present within the envelope 12 individual hydrogen molecules can freely diffuse into the cathode openings 23 which are of greater size than the hydrogen molecules. The hydrogen molecules which do diffuse into the interior of the cathode body 21 will in general make a large number of collisions with the confining surfaces of metal particles 22 before escaping from the cathode body 21. Because of these many collisions the chance of an individual hydrogen molecule being absorbed into a metal particle 22 is greatly increased. Thus, the net number of hydrogen molecules removed from the open regions of envelope 12 is also increased.

Although the powdered metal cathode 21 of FIG. 2 is a preferred embodiment of the present invention, the hydrogen pumping mechanism can also be formed by mechanical deformation of an active metallic body. For example only, under certain conditions the mechanical strains accompanying the solution of hydrogen into active metal cathodes can produce small cracks or fissures therein.

However, the openings or pores in the body of the pumping mechanism must be small enough (a smallest dimension less than .2 millimeter, for example) to confine the hydrogen molecules that gain access thereto. Otherwise the hydrogen molecules could easily escape from the porous body without making any substantial number of collisions with the bodies' metallic surfaces. This would greatly reduce the possibility of an individual hydrogen molecule being absorbed and thereby reduce the number of net hydrogen molecules removed from the system.

FIG. 3 is a diagram of hydrogen pumping speed in liters per second vs. time in minutes illustrating the dramatic hydrogen pumping performance achieved by the porous pumping mechanism shown in FIG. 2. Dotted curve 25 represents the hydrogen pumping speed of a sputter-ion pump of the type shown in FIG. 1 and which utilized solid titanium cathodes. The pumping speed measurements were taken with the pump operating in a hydrogen environment and with a steady hydrogen leak maintaining a pressure of $5 \times 10^{-5}$ mm. Hg. As shown, the pump exhibited a steady state hydrogen pumping speed of about four liters per second until time zero when the pump anode voltage was removed. The residual hydrogen pumping speed then steadily decreased to become substantially zero in less than one minute after anode de-energization. Anode voltage was then re-applied and the hydrogen pumping speed again returned to a steady state value of about four liters per second.

Solid curve 26 represents the hydrogen pumping speed performance of the same sputter-ion pump operated under the same conditions but utilizing the porous cathodes of FIG. 2. The cathodes were made by sintering titanium particles (between 10–25 microns in size). As shown the porous cathode pump exhibited a steady state hydrogen pumping speed of about 30 liters per second until time zero when voltage was removed from the anode electrode. The residual hydrogen pumping speed then decreased very slowly to reach a value of 15 liters per second some 25 minutes after anode voltage was removed. Anode voltage was then re-applied and after a momentary transient reduction the hydrogen pumping speed rapidly increased to again resume a steady state value of 30 liters per second.

The gradual decrease in residual hydrogen pumping speed exhibited by the porous cathode sputter-ion pump after removal of anode voltage is attributed to a contamination of the cathode surfaces by impurities present in the pump's gas environment. This contamination reduces the rate at which hydrogen molecules are absorbed. The renewed application of anode voltage and the associated gas discharge produced thereby causes a heating and sputtering effect on the cathode particle surfaces. This heating and sputtering treatment removes the cathode surface contamination to again provide surfaces which allow a high rate of molecular hydrogen absorption.

Thus, the combination of a sputter-ion pump with porous cathode electrodes provides a unique device in which the porous cathode pumping mechanism produces an extremely high hydrogen pumping speed and the sputter-ion gas discharge maintains the porous cathode pumping mechanism in a condition for optimum performance. Also, this novel combination can be used as an extremely sensitive high vacuum pressure gauge.

Although the combination sputter-ion pump and porous cathode of FIG. 2 is a preferred embodiment of the present invention it is not the only possible use for the unique pumping mechanism shown in FIG. 2. The porous cathode pumping mechanism can be used independently to provide hydrogen pumping. It can also be used in combination with other apparatus which provide a cleaning treatment for the porous body surfaces (such as, for example only, heating apparatus, chemical cleaning devices, etc.).

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electrical sputter-ion pump apparatus comprising an anode electrode, an active metal cathode electrode, means for producing and directing a magnetic field between said electrodes, a vacuum compartment enclosing said electrodes, said vacuum compartment being adapted to connect to a vacuum system, said anode and cathode electrodes adapted to maintain a gas discharge upon energization of said anode electrode, said cathode electrode having pores which permit the free diffusion of hydrogen molecule into said cathode electrode, and wherein the pores in said cathode electrode have a smallest dimension less than .2 millimeters thereby providing a cathode electrode which exhibits an extremely high hydrogen molecular absorption rate.

2. The apparatus according to claim 1 wherein said cathode electrode is composed of bound together active metal particles.

3. The apparatus according to claim 2 wherein said metal particles are titanium.

References Cited in the file of this patent

UNITED STATES PATENTS 2,755,014    Westendorp et al. _____ July 17, 1956

OTHER REFERENCES

"Hydrogen in Metals" (Smith), published by University of Chicago Press, Chicago, Ill., 1948.